Feb. 5, 1957 E. FERMI 2,780,595
TEST EXPONENTIAL PILE
Filed May 4, 1944 4 Sheets-Sheet 1

Inventor:
Enrico Fermi

Feb. 5, 1957  E. FERMI  2,780,595
TEST EXPONENTIAL PILE
Filed May 4, 1944  4 Sheets-Sheet 2

Inventor:
Enrico Fermi
By: Robert A. Lavender
Attorney

Feb. 5, 1957 — E. FERMI — 2,780,595
TEST EXPONENTIAL PILE
Filed May 4, 1944 — 4 Sheets-Sheet 3
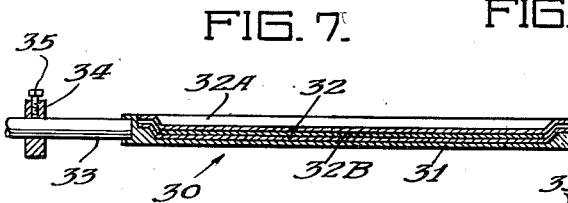
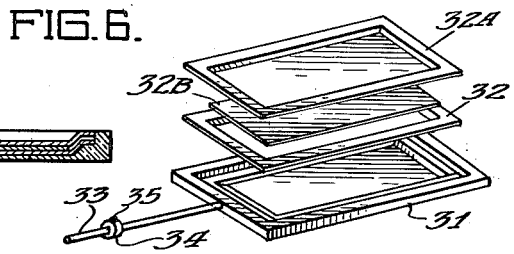
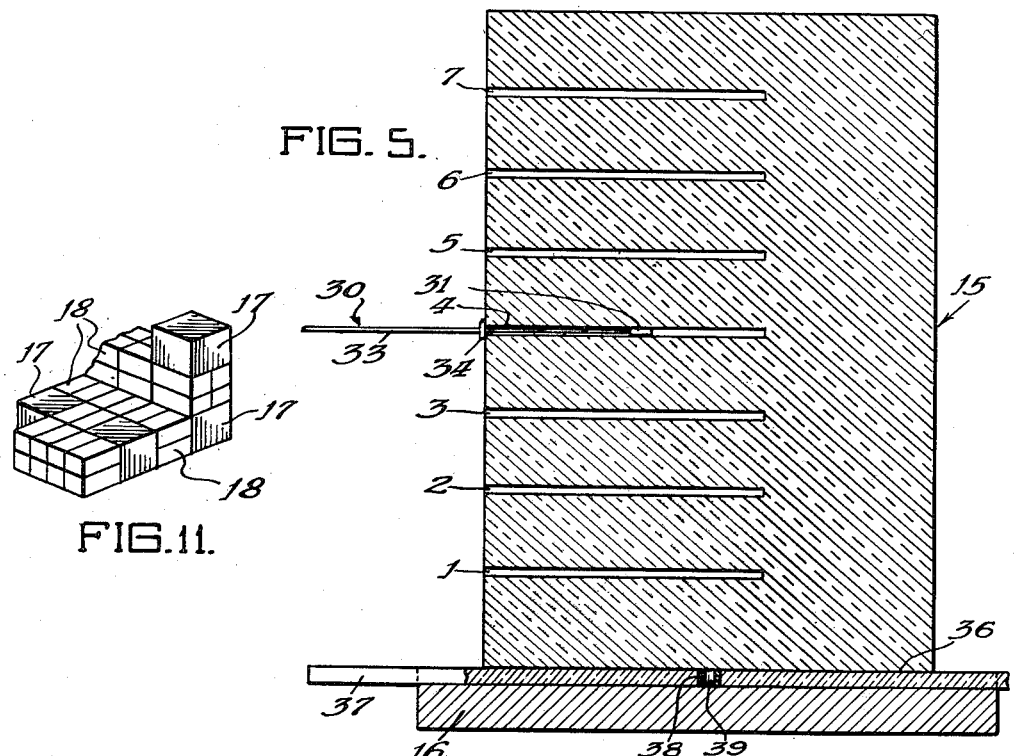
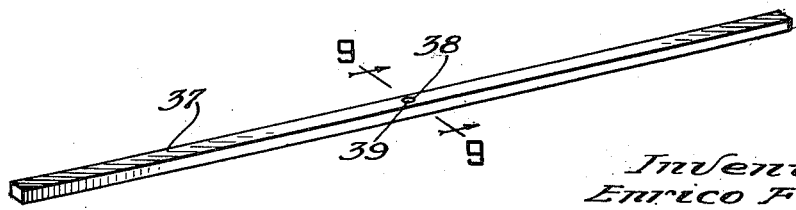
Inventor:
Enrico Fermi
By: Robert A. (Attorney)

Feb. 5, 1957          E. FERMI          2,780,595
TEST EXPONENTIAL PILE
Filed May 4, 1944          4 Sheets-Sheet 4
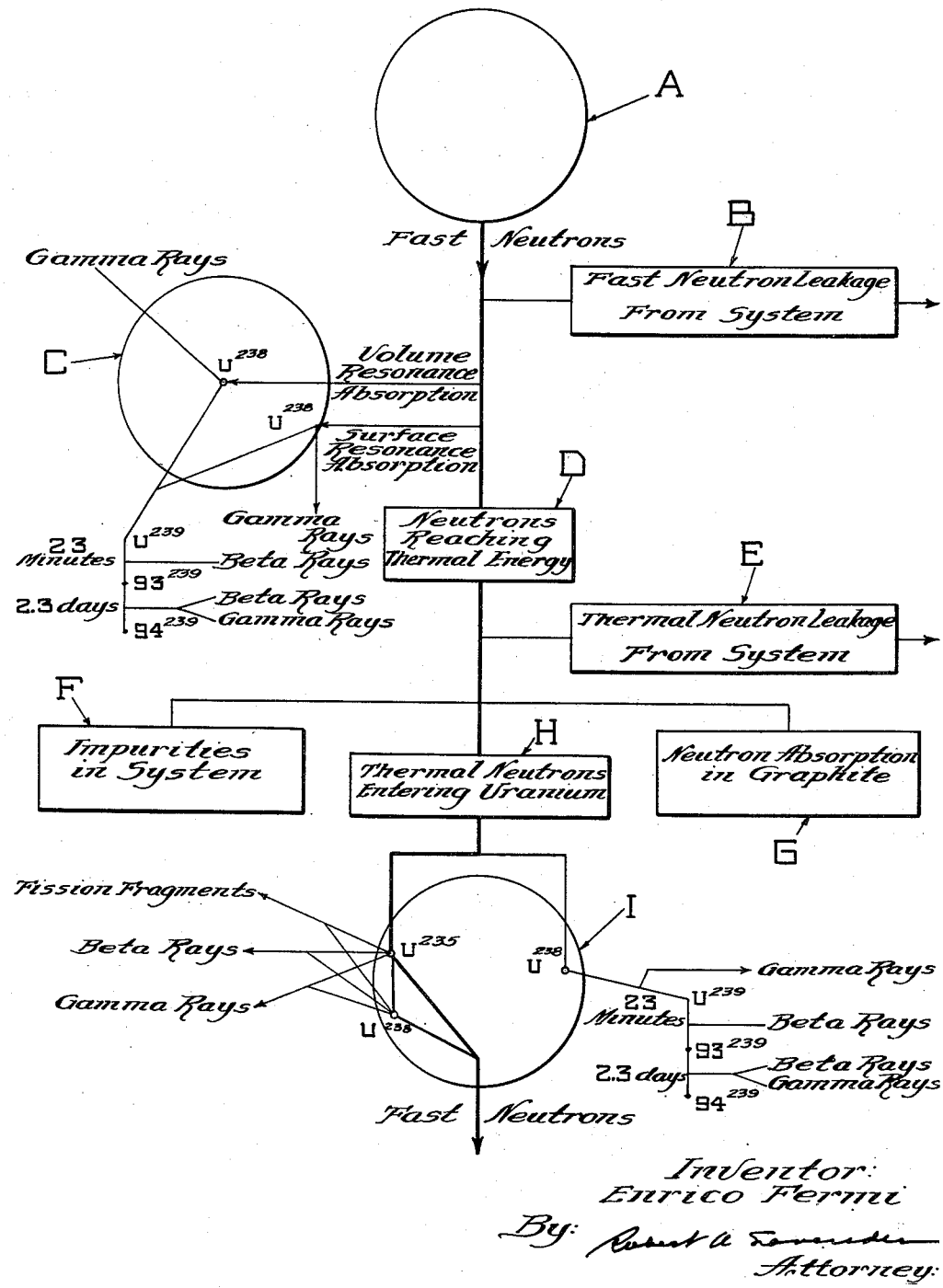
Inventor:
Enrico Fermi
By: Robert A. Lavender
Attorney

United States Patent Office 2,780,595
Patented Feb. 5, 1957

2,780,595

TEST EXPONENTIAL PILE

Enrico Fermi, Chicago, Ill., assignor to the United States of America as represented by the United States Atomic Energy Commission Application May 4, 1944, Serial No. 534,129

1 Claim. (Cl. 204—193)

My invention relates to the general subject of nuclear fission and more particularly to a means and method for creating and measuring a chain reaction obtained by nuclear fission of natural uranium having a $U^{235}$ isotope content of approximately $1/139$.

When it became known that the isotope $U^{235}$ in natural uranium could be split or fissioned by bombardment with thermal neutrons—i. e., neutrons in thermal equilibrium with the surrounding medium—many predictions were made as to the possibility of obtaining a self-sustaining chain reaction system, i. e., a system where the fission neutrons produced give rise to new fission neutrons in sufficiently large numbers to overcome the neutron losses in the system. Since the result of the fission of the uranium nucleus is the production of two lighter elements with great kinetic energy plus about 2 neutrons on the average for each fission, together with beta and gamma radiation, a large amount of power could be made available if a self-sustaining system could be built.

However, the neutrons arising from the fission process are set free with the very high energy of above one million electron volts average and are therefore not in condition to be utilized most efficiently to create new fissions in $U^{235}$. The fast fission neutrons, after they are created, must be slowed down to thermal energies before they are most effective to produce fresh fission by bombardment of additional $U^{235}$ atoms. If a system can be made in which neutrons are slowed down without much absorption until they reach thermal energies and then mostly enter into uranium rather than into any other element, a nuclear chain reaction might be obtained. Light elements, such as deuterium, beryllium, or carbon, the latter preferably in the form of graphite, can be used as slowing agents. Hydrogen would be most advantageous were it not for the fact that there is a high probability of neutron capture by the hydrogen nucleus. A special advantage of the use of the light elements mentioned for slowing down fast fission neutrons is that fewer collisions are required for slowing than is the case with heavier elements. Both beryllium and deuterium are expensive and not readily available in large quantities. However, carbon in the form of graphite is a relatively inexpensive, practical, and readily available agent for slowing fast neutrons to thermal energies. Recently, beryllium has been made available in sufficiently large quantities for test as to suitability for use as a neutron slowing material in a system of the type to be described. It has been found to be in every way as satisfactory as carbon.

This invention is concerned with a chain reacting system based on the combination of a fissionable material and a slowing medium in such a manner that the neutron reproduction in a system of practical size is greater than the number of neutrons lost in the system.

The earliest attempts to provide a structure capable of sustaining a chain reaction, using nautral uranium, involved the use of fine uranium particles such as uranium oxide powder, dispersed in water as the slowing agent. However, these attempts were not successful, and analysis of experiments made has indicated that the neutron losses in such a system will prevent a chain reaction from being sustained irrespective of the size of the system. A chain reaction, however, will take place in such a system but the chain started by any number $n$ of neutrons will die out after producing a number of fissions. Such a chain is known as a convergent chain reaction. It is only when the chain started by a number $n$ neutrons continues with more than $n$ neutrons being produced at each fission cycle that the chain can be said to be divergent. Even when the chain may be said to be divergent, neutron losses still may be sufficiently high to prevent the sustaining of the chain reaction in a system of practical size. It is therefore important to know where such neutron losses occur.

During the interchange of neutrons between uranium particles or bodies dispersed in a slow medium, neutrons may be lost in four ways: by absorption in the uranium metal or compound in which the neutrons originated or in which they finally may enter without producing fission, by absorption in the slowing down material, by capture by impurities present in the system, and by escape from the structure by diffusion.

Natural uranium, particularly by reason of its large $U^{238}$ content, has an especially strong absorbing power for neutrons when they have been slowed down to a moderate energy, this absorption occurring at the so-called resonance energies. The absorption in uranium at these energies is termed the uranium resonance absorption or capture; it is caused by the isotope $U^{238}$ and does not result in fission but leads to the production of the relatively stable nucleus $94^{239}$. It is not to be confused with absorption or capture of neutrons by impurities, referred to later.

Neutron resonance absorption in uranium may take place either on the surface of the uranium bodies, in which case the absorption is known as surface resonance absorption, or it may take place further in the interior of the uranium body, in which case the absorption is known as volume resonance absorption. Volume resonance absorption is due to the fact that neutrons make collisions inside the uranium body and may thus reach resonance energies inside the body and be absorbed at once. After successfully reaching thermal velocities, the neutrons may also be subject to capture by $U^{238}$ without fission, leading to the production of $94^{239}$.

The thermal neutrons are also subject to capture by the slowing material. While carbon, beryllium and deuterium have very small capture cross-sections for thermal neutrons, an appreciable fraction of thermal neutrons is lost by capture in the slowing material during diffusion therethrough before a uranium body is reached. It is therefore desirable to have the neutrons, after reaching thermal energy, promptly enter uranium.

In addition to the losses which are inherently a part of the nuclear chain reaction process, impurities present in both the slowing material and the uranium add a very important neutron loss factor in the chain. The effectiveness of various elements as neutron absorbers varies tremendously. Certain elements such as gadolinium, boron, cadmium, and some others, if present even in a few parts per million, could very likely prevent a self-sustaining chain reaction from taking place. It is highly important, therefore, to be able to evaluate in some manner the effect of losses due to such impurities, and as far as possible to remove from both the slowing material and the uranium all impurities capturing neutrons to the detriment of the chain reaction.

The ratio of the number of fast neutrons produced in one generation by the fissions, to the original number of fast neutrons, in a system of infinite size, is called the reproduction or multiplication factor of the system and is denoted by the symbol K. As it disregards finite size of the system, K therefore is a factor determinable from the geometry of the system, i. e. the slowing material employed and the manner of disposition of the uranium on other fissionable material in the slowing material, together with the effect of the fixed impurities in the materials. If K can be determined to be greater than unity, indicating that fewer neutrons are parasitically absorbed than are gained by fission, the uranium will support a self-maintaining chain reaction provided the overall size of the system is sufficiently large to prevent too large a percentage of the generated neutrons from escaping from the system. Thus the overall size is important, when K is greater than unity.

The overall size required for the system will vary, depending upon the neutron losses in the chain. If the structure is too small, with a large surface to volume ratio, there will be a high rate of loss of neutrons from the structure by leakage through the outer surfaces which may reduce the number of neutrons available for the fission chain inside the structure to a point where the chain reaction will not be self-maintaining. For each value for the reproduction factor K greater than unity, there is thus required a minimum overall size of the structure known as the critical mass or size, above which the rate of loss of neutrons by diffusion through the periphery of the structure is less than the net rate of production of neutrons within the system, thus making the system self-sustaining. The rate of diffusion of neutrons away from a large structure in which they are being liberated, can be treated by mathematical analysis.

However, K can still be greater than unity but so close to unity that no system of practical size will sustain a chain reaction as the rate of exterior neutron loss will always be too high, irrespective of any practical size to which the structure is built. It is important therefore, that all losses be kept to the minimum to provide a K factor sufficiently large to enable a system capable of sustaining a chain reaction to be of practical size.

Fig. 5 is a vertical sectional view taken on the line 5—5 of Fig. 1;

Fig. 6 is an enlarged perspective view of the detector unit employed for making measurements in the device, the view showing the pans or trays spaced apart for purposes of clarity;

Fig. 7 is a longitudinal sectional view through the plate portion of the detector unit shown in Fig. 6;

Fig. 8 is a perspective view of a rod containing the neutron source shown in Fig. 5;

Fig. 9 is an enlarged, fragmentary, detailed sectional view of the rod and neutron source shown in Figs. 5 and 8, the view being taken on the line 9—9 of Fig. 8;

Fig. 10 is a diagram or chart showing what happens to the neutrons during the chain reaction; and Fig. 11 is a perspective view of a portion of the intermediate pile, showing the block construction.

Figure 1:
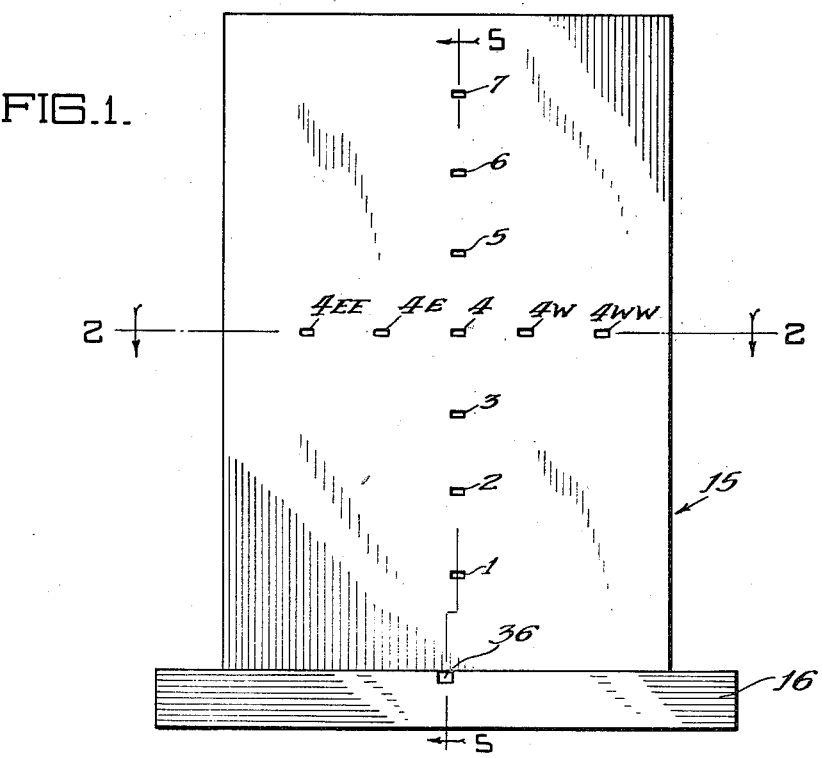
Fig. 1 is a front elevational view of an intermediate pile forming part of the subject matter of the present invention.
Figure 2:
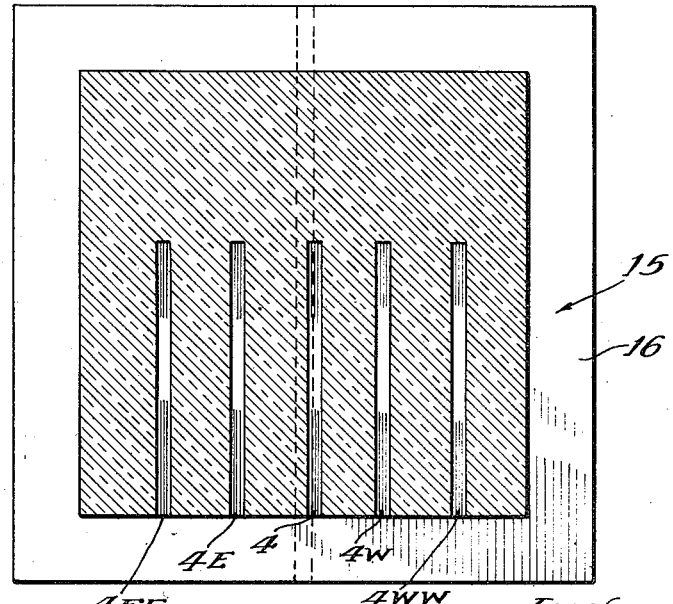
Fig. 2 is a horizontal sectional view taken on line 2—2 of Fig. 1.

To illustrate the importance of the various factors entering into a chain reaction, I shall next describe the chain reaction process, as it is presently understood to occur in any system of finite size utilizing natural uranium dispersed in graphite. For better explanation, reference is here made to the diagram constituting Fig. 10 of the accompanying drawings.

In Fig. 10:

A represents a uranium body of any size from which fast neutrons are set free as a result of the fission process.

B represents a fast neutron loss due to leakage from the system.

C represents a uranium body of any size in which both volume and surface resonance absorption of neutrons by $U^{238}$ takes place, at resonance energies above thermal energy, to form $94^{239}$.

D represents the number of neutrons reaching thermal energy.

E represents a thermal neutron loss by diffusion of thermal neutrons from the system.

F represents a neutron loss caused by capture of neutrons by impurities in both uranium and graphite.

G represents a neutron loss due to capture of thermal neutrons by the graphite as the thermal neutrons diffuse therethrough before entering uranium.

H represents the number of thermal neutrons entering a uranium body.

I represents a uranium body of any size in which part of the thermal neutrons entering the body are absorbed by $U^{238}$ to form $94^{239}$, the remaining thermal neutrons causing new fissions in $U^{235}$, thereby producing fast neutrons, a few of which produce additional fast neutrons by fission of $U^{238}$ atoms.

The four neutron losses from the chain reaction referred to above are represented in Fig. 10, where the resonance absorption at C and the fraction of thermal neutrons absorbed by $U^{238}$ at I represent the uranium absorption losses. Losses due to impurities are represented at F, those due to absorption in the slowing material at G, and the leakage losses due to the finite size of the system at B and E.

It has been determined from previously performed experiments that a mixture of natural uranium oxide powder dispersed in water will not sustain a chain reaction even if used in a system infinite in size, because K has been determined to be less than unity for such a combination. It is necessary, therefore, in order to increase the probability of a system attaining a K greater than unity, to either increase the ratio of fission neutrons produced per cycle, or to reduce the neutron losses in a proposed system, over those obtaining in the mixture of uranium powder and water referred to.

The use of uranium enriched by supplementing the natural content of fissionable material therein will increase the probability of an absorbed thermal neutron producing fission rather than being absorbed by $U^{238}$ to produce $94^{239}$, and the number of fast neutrons per cycle will be increased. However, if natural uranium alone is to be used, the only way to increase the probability of K becoming greater than unity is to reduce the parasitic neutron losses in the system from those existing in the uranium oxide powder-water system. The slowing medium can be changed from water to heavy water, graphite or beryllium to decrease neutron capture by the slowing medium. The effect of impurities can be reduced by purifying both the uranium and the slowing material to the maximum practicable extent. All of these procedures tend to reduce the neutron losses in the chain, and to increase the possibility of K becoming greater than unity.

In addition, in order for the premise to be fulfilled that the fast fission neutrons be slowed to thermal energies in a slowing medium before again entering uranium atoms without too large an absorption in uranium, a change in the physical arrangement of the uranium in the system from that obtaining in a mixture of uranium powder and a slowing material can be utilized for more efficient reproduction of neutrons.

I have found, for example, as will be hereinafter proved, that it is possible by proper physical arrangement of the materials to substantially reduce the resonance absorption loss of neutrons in a system below the uranium resonance absorption loss occurring in a mixture of fine uranium oxide powder in water having the same uranium to slowing materials volume ratio. By the use of the light elements as described above for slowing materials, fewer collisions are required to slow the neutrons to thermal energies, with resultant large increments of energy loss between collisions, thus decreasing the probability of a neutron being at any resonance energy as it enters a uranium atom. During the slowing process, however, neutrons are diffusing through the slowing medium over random paths and distances so that the uranium is exposed not only to thermal neutrons but also to neutrons of energies varying between thermal energy and the high initial energy of fission evolved neutrons. Neutrons at uranium resonance energies will, if they enter uranium at these energies, be absorbed on the surface of a uranium body, whatever its size, giving rise to surface absorption. Any substantial overall reduction of surface of the same amount of uranium will therefore reduce surface absorption, and any such reduction in surface absorption will release neutrons to enter directly into the chain reaction.

For a given ratio of natural uranium to slowing material, surface resonance absorption losses of neutrons in the uranium can be substantially reduced by a large and significant factor from the losses occurring in a structure comprising a distribution of fine uranium oxide powder throughout a slowing medium, by aggregating the uranium into a plurality of substantial masses in which the mean spatial diameter is at least 1 cm. In graphite, for example, an appreciable advantage is obtained. An important gain thus can be made in the number of neutrons made directly available for the chain reaction. Graphite is an efficient slowing medium, is readily obtainable, and is preferred for most structures. Consequently, I prefer to place the uranium in the system in the form of spaced uranium masses or bodies of substantial size preferably either of uranium metal, oxide, carbide, or combinations thereof, instead of using the uranium in the form of fine particles. The uranium bodies can be in the form of layers, rods or cylinders, cubes or spheres, or approximate shapes, dispersed throughout the graphite preferably in some geometric pattern. As graphite can be obtained in the form of blocks, and structures built by stacking or piling the blocks, a structure called a pile can readily be built for test purposes.

Theoretical calculations can be made to determine whether or not a chain reaction having a K factor greater than unity would be possible in various types of geometrical combinations of uranium and slowing material. Such calculations, however, of necessity must assume more or less arbitrary values for the fission factors and for the various neutron absorption effects of the uranium, the carbon, and the impurities set forth in C, F, G and I of Fig. 10 including the effect of the physical arrangement of the materials, as accurate values for the constants representing these effects are not available. It would be impossible by such theoretical calculations to predict accurately, either that a self-sustaining chain reaction was possible in a given system, or to predict the type of structure, critical size or design of a system that could be built with any assurance that a self-sustaining chain reaction capable of producing power would be obtained. The errors due to the imperfectly known constants become cumulative during calculation of the reproduction factor K, and the conclusions arrived at from such calculations can be little more than mere guesses at approximate conditions that might obtain if the assumed values of the constants were eventually found to be close to their real or proper values.

Progressive empirical enlargement of any proposed system for which the factor K is not accurately known, in an attempt to attain the overall size of the structure above which the rate of loss of neutrons by diffusion through the periphery of the structure is less than the rate of production of neutrons in the system leads only to an expensive gamble with no assurance of success. The fact that K is greater than unity and the fact that the critical size is within practical limits must be known rather accurately in advance, as otherwise a proposed structure having a K factor less than unity, or even a K factor greater than but close to unity, might not sustain a chain reaction even if all of the uranium in the world were included.

In order, therefore, that any practical self-sustaining chain reacting system be built, the following factors must be accurately known prior to building the system:

1. Whether K is above or below unity, and
2. If K is above unity, what will be the minimum critical size required for a self-sustaining chain reacting system built up of the materials chosen, and with the geometrical arrangement proposed.

As the effect of any attempt, such as mentioned above, to increase the reproduction factor K of a system, cannot, as pointed out above, be accurately foretold from calculations alone, it has been necessary to provide a means and method of determining the value of the reproduction factor in any proposed system. As all of the steps in the chain reaction outlined above contribute to the value of the reproduction factor, if the value of K can be directly determined as to its relation to unity by direct measurement of neutron densities existing in structures having specific geometries and materials, then values of the individual contributing constants do not have to be known.

It follows that the main object of my invention is to provide a means and method of determining, by means of a single series of neutron density measurements which can be performed with precision on an experimental structure whether the reproduction factor of any proposed chain reacting structure is greater or less than one, and then determining from the same measurements the critical size of a self-sustaining system, if K is found to be greater than one, without the necessity of knowing the values of individual factors entering into the chain process.

In addition, fairly accurate evaluations of the reproduction factor for various systems can be deduced by including two other quantities, the so-called "range" of the fission neutrons in being slowed down and the "diffusion length" of thermal neutrons in the structures. Although there is at present an inaccuracy of 5 percent to 10 percent attached to the values of these quantities, they enter only into the determination of the departure of the reproduction factor from unity. Since the departure of K from unity in structures of the types set forth herein is usually not greater than 10 percent, the value of K can be found within an accuracy of 1 percent or less by using the values presently known.

Thus, a further object of my invention is to provide a method of determining the value of the reproduction factor K of a given design within a 1 percent error for specific sizes, shapes, and spacings of uranium bodies in the slowing down material and for the particular purities of the elements making up the device.

Inasmuch as the same nuclear fission mechanism is acting in all portions of a structure where the same geometry of uranium and slowing material exists, the only difference in the chain reaction in a small but representative portion of the structure from the chain reaction in the entire structure is that the rate of neutron loss by exterior leakage is greater in small structures than in larger structures. I have found that by measuring the neutron densities in a small structure and mathematically correlating the density measurements made with the dimensions of the small structure, I can determine the chain reaction conditions that would exist in a much larger structure having the same geometrical arrangement of the same materials.

The present invention is therefore valuable as a relatively inexpensive device for measuring the action of the nuclear chain mechanism in a relatively small structure, and particularly for determining a quantity Δ (defined below), for specific conditions, and for studying the effect on this and related quantities of changes in these conditions. The factor K will be greater than unity if Δ is found to be negative. An accurate calculation can be made as to the critical size required for a self-sustaining chain reaction structure providing the value of Δ is ascertained to be negative and its value determined, as I have found that it may be, in a small but representative portion of any proposed chain reacting structure. There is, therefore, no need of actually building a structure of supposed critical size based solely on calculations using assumed constant values, in order to make a trial of the geometry and purity of materials to be used. Thus the purchase of the complete amounts of materials for the proposed structure need be made only after the desired and accurate specifications for the structure have been experimentally determined by means of my invention.

It is, therefore, another object of my invention to be able to determine in advance of building a large scale structure, whether or not the system proposed will operate to sustain a chain reaction, by measurement of the neutron activity in a much smaller but representative section of the proposed system, this latter section by itself being too small under any conditions to operate to sustain a chain reaction, because of excessive loss of neutrons from the exterior surface of the smaller structure.

It therefore follows that, having attained the foregoing objects, it is a still further object of my invention to test means for decreasing the parasitic neutron losses obtaining in a mixture of uranium and slowing down material so that K factors more favorable to the attainment of a self-sustaining chain reaction can be obtained in a system of finite size.

In a presently preferred form, as to apparatus, my invention relates to a test exponential pile comprising a column of rectangular parallelopiped shape consisting of a desired arrangement of uranium containing bodies of sub-critical mass embedded in a slowing material such as heavy water, graphite or beryllium. The column may be built up or piled on a suitable base layer by layer. Valuable material can be saved by constructing the column on a base of slowing down materials such as, for example, graphite or paraffin. A source of neutrons may be placed near the bottom of the column. The source may be placed inside the base so that the neutrons are slowed down partially before entering the column to be investigated. Slots are preferably provided in the column at varying distances from the neutron source, and neutron detectors inserted therein as desired for measurement of neutron intensity. This structure can be considered as a small but representative portion of a proposed self-sustaining chain reacting structure. According to the type of experiment being performed, the weight of the structure can vary widely, but in many instances 25 to 100 tons of materials will suffice for the system. In the case of the heterogeneous structure, it should have a sufficient number of repetitions of cells comprising the uranium bodies and their individual complements of slowing material, so that the variations in neutron density through the cells along any chosen axis are minor variations in comparison with the overall neutron density variation along the same axis. The amount of material required for this purpose is substantially smaller than any structure capable of a self-sustaining chain reaction utilizing natural uranium, and experiments have proven that accurate measurements can be made on structures $\frac{1}{10}$ of the critical volume when K is greater than unity.

The foregoing constitute some of the principal objects and advantages of the present invention, others of which will become aparent from the following description and the drawings which illustrate one example of the invention.

A specific embodiment of the present invention is selected for purposes of disclosure, it being recognized that many modifications may be made without departing from the intended scope of the invention.

Referring to the figures, the structure or pile, generally indicated at 15 in Fig. 1 representing, for example, a portion only of a proposed self-sustaining chain reaction system, is a column 11 feet high having a square cross-section with a dimension of about 8 feet on a side. The column rests on a paraffin base 16, which is about 10 feet square and 1 foot thick. The base may be also made of a layer of about 3 feet (thick) of graphite, if desired.

Figure 3:
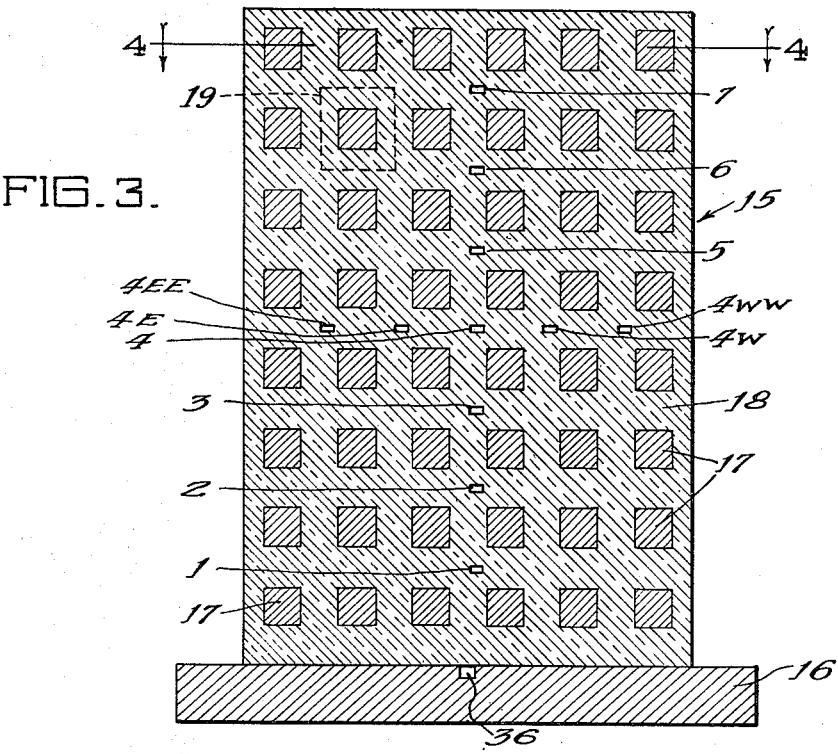
Fig. 3 is a vertical sectional view taken through the device on line 3—3 of Fig. 4.
Figure 4:
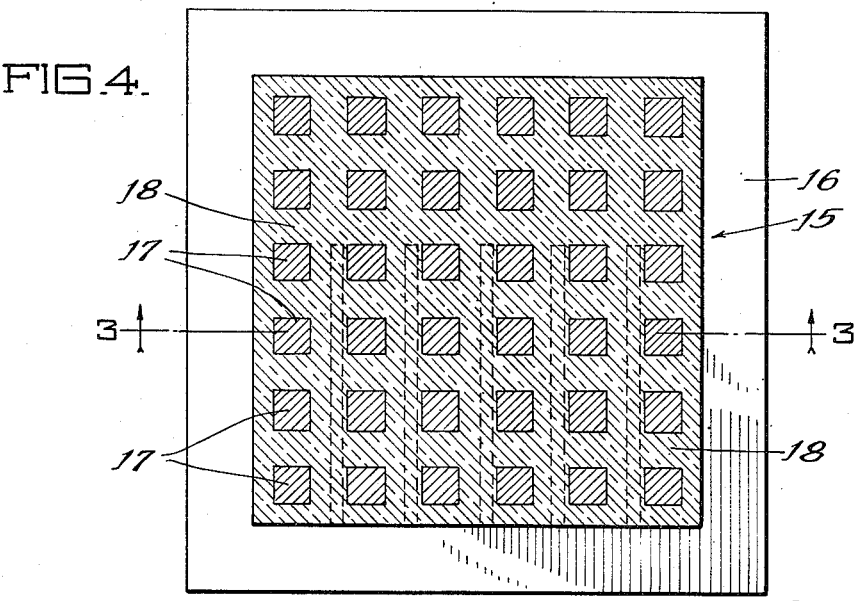
Fig. 4 is a horizontal sectional view taken on the line 4—4 of Fig. 3.

As shown in Figs. 3 and 4, the device comprises a plurality of uranium bodies in the form of cubes 17 of about 8 inches on a side, arranged in graphite 18. The distance between the uranium bodies is 8 inches. Between the paraffin base 16 and the first layer of uranium cubes 17 is a layer of graphite 8 inches thick.

Referring to Fig. 3, the structure as shown consists of a plurality of cell units 19, each cell comprising one uranium body and a mass of graphite, and, as shown in Fig. 3, each cell has a side equal in length to twice that of the side of the uranium body. In accordance with the general meaning, a cell is that unit which is repeated throughout the mass to form the entire structure.

Though specific dimensions for the reacting structure have been given, it is recognized that certain variations may be made. As a general proposition, it can be stated that reliable readings may be taken in structures of smaller sizes, but as the size of the structure decreases the readings will become less accurate. Conversely, as the size of the structure increases over and above that specified, the readings become more accurate. Very satisfactory results within 1 percent error can be obtained, however, from the specific size of structure illustrated. If fewer cell units are used, the error will be increased above 1 percent. In the example illustrated, 288 cells were used. The overall size should be sufficiently large so that the variations in neutron density within one cell are small compared with the average neutron density along the measured axis. An appreciable number of fast neutrons must be slowed to thermal energy in the graphite in order to accomplish this result.

A plurality of measuring slots 1 to 7, inclusive, are spaced vertically in the column 15, and additional slots 4E, 4EE, 4W, and 4WW are spaced horizontally at the level corresponding to slot 4. These slots are all five feet long and have a cross-section measurement of 2 inches by $\frac{3}{8}$ of an inch. Slots 1 to 7, inclusive, extend through the graphite to points near, but slightly to one side of the vertical axis of the column.

A detector device, shown generally in Fig. 5 at 30, is insertable in any one of the detecting slots 1 to 7, inclusive, and includes a relatively thin graphite tray 31 hollowed out to receive a pair of nesting aluminum or cadmium trays 32 and 32A. The size of the graphite tray 31 is slightly less than 2 inches by $\frac{3}{8}$ of an inch, so that it may readily be passed in and out of the detector slots. An aluminum rod or handle 33 is fastened to one end of the detector tray 31 and is of sufficient length to permit moving the graphite tray 31 throughout the entire length of any one of the slots 1 to 7, inclusive. An adjustable collar 34 is movable lengthwise on the handle 33 and is provided with a set screw 35, so that the collar may be fixed at any desired position on the handle. The purpose of this collar is to facilitate the positioning of the detector tray 31 at any desired location in one of the detecting slots.

A detector foil 32B of indium is placed between the nesting trays 32 and 32A for the purpose of making measurements of neutron density in the column. The foils are rectangular, having dimensions of 4 by 6.35 centimeters, and are between 5.5 and 6 mils in thickness. All foils have been previously standardized for their radioactivity response to neutron bombardment by comparison with a standard foil. The trays 32 and 32A are of two kinds, i. e., either both of aluminum or both of cadmium. The aluminum permits thermal neutrons to pass through to the detector foil, whereas the cadmium absorbs the thermal neutrons before they can reach the foil. It is possible to determine the relative density of therman neutrons present in the region of the detector element by exposing the indium foil to neutron bombardment when held between aluminum trays, and taking the difference between this induced radioactivity, and the radioactivity induced when the foil is exposed to neutron bombardment while held between cadmium trays.

The method of measuring the neutron density is as follows:

Assume that a source of neutrons has been placed at the bottom of the pile, alined with the vertical axis. An indium foil 32B of the dimensions specified is placed between aluminum nesting pans 32 and 32A of the detector device 30. The detector device is then inserted in one of the detecting slots, as, for example, slot 1, and exposed to the neutrons present at a point near the vertical axis. In one mode of measurement the indium foil is then allowed to remain in the slot for a predetermined period of time in order to come to a known fraction of its saturation activity—say, 15 minutes—during which time it is bombarded by the neutrons inside the structure. At the end of this time interval, the detector device 30 is withdrawn from the slot, and after a predetermined lapse of time—say three minutes—during which time the short-lived radioactivity of the indium foil disappears, the indium foil is then wrapped around the cylinder of a standardized Geiger counter and the beta rays emanating from the foil due to the remaining and longer lived radioactivity of the foil are counted for a given time interval, say 30 minutes. From the number of counts during this time interval, the initial saturation radioactivity at the time of removal is computed. The indium foils can be reused after several days, as the induced radioactivity has then decayed to an insignificant value. Measurements are made in the same manner and in the same positions with the same time factors to determine the cadmium ratio, later referred to.

However, for convenience and also because a given exposure time may be too long in regions of high neutron density, yielding too many counts per minute for the counter to handle accurately, or may be too short in very low density regions, yielding too few counts for accurate representation, the time schedules may be changed to compensate. In this case, however, the saturation activity $A_s$ in counts per minute should be calculated, as is well-known in the art. The following equation has been used under these circumstances:

$$A_s = \frac{fC}{e^{-ft_w}(1-e^{-ft_x})(1-e^{-ft_c})}$$

Where C is the observed number of counts in time $t_c$, and in minutes, $t_x$, $t_w$ and $t_c$ are respectively the periods of irradiation, waiting and counting, and where $f$ is the fraction of the excited (radioactive) atoms that disintegrate in a unit of time, and for indium equals 0.012836 per minute.

The detector device 30 is then inserted into the slot 2 and a similar reading is taken close to the vertical axis in this slot, corresponding to that in slot 1. Likewise, readings are taken close to the vertical axis of the column in all of the other slots 3 to 7, inclusive. In this manner, the radioactivity of the indium caused by the slow neutron bombardment at points close to the vertical axis of the reacting structure may be determined accurately, and expressed in terms of counts per minute of the Geiger counter. From this information, the ratios of the counts measured in adjacent horiontal planes in the structure can be obtained. Other readings are taken on the top and sides of the structure, as will be pointed out later.

As there are minor variations in neutron density along any given axis due to the periodically recurring cells in a structure wherein the uranium is aggregated, the neutron density can be considered as averaged over the individual cell. In order that measurements along an axis may be properly compared, the measurements are made in the same relative position in the various cells along the axis being investigated.

The measurements made close to the vertical axis express the decay of the chain reaction started by the source, and when the position readings are corrected for the finite size of the structure, can be used to find the value of $\Delta$.

To explain the relation of $\Delta$ and the reproduction factor K to the observable quantities as measured, it is desirable to first consider a mathematical description of the effect of diffusion, absorption, and neutron production on the neutron density at some point in the structure.

In the following mathematical discussion, the symbols listed below will be used with the meanings as indicated:

X, Y, Z are the rectangular coordinates of a point in a coordinate system with its origin at the neutron source at the base of the pile, whose X and Y axes are parallel to the sides of the structure, and whose Z axis is the central vertical axis of the structure;

$a$ is the effective length of side of the structure;

$a_0$ is the actual length of side of the structure;

$n$ is the number of thermal neutrons per cc. in the neighborhood of the point X, Y, Z;

$v$ is the mean velocity of the thermal neutrons;

$ds$ is an increment of distance traversed by a neutron;

$dt$ is the increment of time corresponding to $ds$;

$\Lambda$ is the mean total distance a thermal neutron travels;

D is the diffusion coefficient for thermal neutrons;

$\Delta n$ or $\Delta q$ is an abbreviation for the sum of the three second derivatives of $n$ or $q$ with respect to the three variables X, Y, Z. $\Delta n$ is also referred to as the Laplacian of $n$;

$\Delta$ standing alone and not immediately followed by $n$ or $q$ signifies a number given by the ratio of $\Delta n$ to $n$. This number is found to be constant throughout any structure utilizing given geometries and materials;

$\lambda$ is the neutron mean free path between collisions;

$r$ is the radius of a sphere or cylinder;

$r_0$ is the range, or the mean distance the neutrons reach from their point of origin during the process of slowing down to thermal energy. For chain reacting structures the value is calculated to be about 35.5 cm. for uranium and graphite, for uranium and beryllium about 27 cm., and for uranium and deuterium (employed as heavy water) about 22 cm.;

T (tau) is a variable called the age of the neutrons which is a function of their energy during slowing down. For thermal neutrons T becomes $\frac{1}{4}r_0^2$;

$q$ is the number of neutrons destined to escape resonance capture by uranium, slowed down per sec. per cc. at X, Y, Z, to a given energy E or below, from higher energies, and is to be regarded as a function of the age corresponding to the energy E;

$q_0$ is the number of fast fission neutrons destined to escape resonance capture by uranium produced per sec. per cc;

L is the diffusion length of thermal neutrons in the structure. For uranium and graphite chain reacting structures the value is calculated to be about 18.5 cm., and for uranium and beryllium about 25.3 cm. For uranium and deuterium the value is between 100 and 200 cm.;

K is the reproduction factor;

$\Sigma$ signifies a sum and is used to indicate a series of which a typical term follows the symbol;

$C_{jl}$ is one typical constant in this series; $j$ and $l$ are two odd integers characterizing the terms of the series;

$b_{j,l}$ is the value of the quantity occurring in the expression $$e^{-\frac{Z}{b_{j,l}}}$$

which is part of the first term in the series giving the value of $n$ for different heights $Z$;

$$C_{1,1} \cos \pi \frac{x}{a} \cos \frac{y}{a} \left( e^{-\frac{Z}{b_{1,1}}} \right)$$

is the first term in a series, and is referred to as the first harmonic term, the following terms being referred to as the third, fifth, etc., harmonic terms;

$$\frac{\delta q}{\delta \tau}$$

is the partial derivative of $q$ with respect to $\tau$.

With these symbols in mind, the various factors governing the variation in the thermal neutron density $n$ at a point in the graphite may be taken into account as follows: The number of thermal neutrons produced per second per cc. at $X, Y, Z$ in consequence of the reduction of more energetic neutrons to the thermal condition is given by the value of $q$ for thermal energy. The contribution to $n$ by diffusion from the surrounding medium is $D \cdot \Delta n$. The chance of a neutron being absorbed in traversing a distance $ds$ is $$\frac{ds}{\Lambda}$$

The number of thermal neutrons absorbed per second is $$\frac{nv}{\Lambda} \text{ since } \frac{ds}{dt}$$

is the velocity $v$. Consequently, in a steady state:

$$D \cdot \Delta n - \frac{nv}{\Lambda} + q = 0 \quad (1)$$

The number $q$ is given by a solution of the slowing down equation $$\Delta q = \frac{\partial q}{\partial \tau}$$

obtained by consideration of the diffusion of the neutrons during the slowing-down process and by suitably fixing the dependence of the age variable $\tau$ on the energy $E$. Initially $$(\text{i. e., for } \tau = 0) q = K \frac{nv}{\Lambda}$$

since K is defined as the number of fast neutrons destined to escape resonance capture, produced per thermal neutron absorbed. A solution is $$q = K \frac{nv}{\Lambda} e^{\tau \Delta}$$

since, as stated above $$\frac{\Delta n}{n}$$

is observed to be a constant whose value is designated as $\Delta$. If this is substituted in (1) using the kinetic theory formula $D = \frac{1}{3} \lambda v$ and putting $L^2 = \frac{1}{3} \lambda \Lambda$ the following equation governing the neutron density is obtained:

$$\Delta n - \frac{1}{L^2} n + K \frac{n}{L^2} e^{\tau \Delta} = 0 \quad (2)$$

and by rearranging terms and putting $$\frac{\Delta n}{n} = \Delta \quad (3)$$

$$K = (1 - L^2 \cdot \Delta) e^{-\tau \Delta} \quad (3a)$$

In most cases in which this invention is used, the value of $K-1$ is less than 0.1 so that the exponential term may be replaced by the first two terms of the expansion in series. Thus, since $\tau = \frac{1}{4} r_0^2$ $$K - 1 = -\Delta (L^2 + \frac{1}{4} r_0^2) \quad (4)$$

Equations 3a and 4 clearly show that the value of $\Delta$ depends only on K, L and $r_0$ and that the same value of $\Delta$ will hold for a large structure as well as a small one having the same internal construction and materials. Substituting $$\frac{\Delta n}{n}$$

for $\Delta$ in 4, the differential Equation 2 becomes $$\Delta n = -\frac{K-1}{L^2 + \frac{1}{4} r_0^2} \cdot n \quad (5)$$

Equations 3a and 4 show that if the value of $\Delta$ as found by measurements on the pile comes out negative, then the reproduction factor K is greater than unity, and if the value of $\Delta$ is positive then K is less than unity. It will be seen later that the numerical value of $\Delta$ also fixes the overall size of a self-maintaining chain reacting structure when $\Delta$ is negative.

It is also to be understood that $\Delta$ is a value independent of the external shape of the intermediate pile from which it is ascertained, and of the external shape of the operating pile to be designed, so that, for example, $\Delta$ determined by measurements of a parallelopiped-shaped intermediate pile may be used to compute critical size for a self-sustaining pile of any shape, such as a sphere, cylinder or cube.

Theoretically from (3) the quantity $\Delta$ could be found from neutron density measurements made on a structure of any size and shape. However, certain simple regular structures have great advantages for convenience and accuracy in calculation. A sphere or a cylinder could be used, but the preferred form of my invention is a rectangular parallelopiped, more particularly a long vertical parallelopiped with a rectangular cross-section. For this case a mathematical formula can be given for the neutron density distribution at various points throughout the pile when a source of neutrons is used at an end thereof. Having this formula available with measurements of the density distribution and with the proper constants chosen to fit the measurements, the value of $\Delta$ can be very readily deduced for the geometry and materials used in the structure.

For the case of a long vertical rectangular parallelopiped with square cross-section of side length $a$, this formula is the double Fourier series:

$$n = \Sigma C_{jl} \cos j \pi \frac{x}{a} \cos l \pi \frac{y}{a} \left( e^{-\frac{Z}{b_{jl}}} \right) \quad (6)$$

in which $$\frac{1}{b^2_{jl}} = \frac{1}{b_{1,1}^2} + \frac{(j^2 + l^2 - 2) \pi^2}{a^2} \quad (6a)$$

Here each term satisfies (5), so that the sum is also a solution. This is a series in which the various terms are given by putting $j$ and $l$ equal to (1,1), (1,3), (3,1), (3,3), etc. in succession. The adequacy of the formula is tested by measuring the neutron densities in a horizontal plane at some constant height Z. These measurements also serve to determine the constants $C_{1,1}$, $C_{1,3}$, $C_{3,1}$, $C_{3,3}$, etc., which multiply the succession terms of the series (6).

However, the neutron density distribution across the pile at considerable distances from the source approaches a true cosine curve and is given more and more accurately by the first term alone of Formula 6 as the height of the pile increases and the plane of measurement is more and more removed from the influence of the source. This simplifies Formula 6 to:

$$n = C_{1,1} \cos \pi \frac{x}{a} \cos \pi \frac{x}{a} \left( e^{-\frac{Z}{b_{1,1}}} \right) \quad (7)$$

since $b_{1,1}$ is the largest $b$, and the amplitudes of all the higher harmonic terms decrease at a faster rate with increasing distances from the source.

When measurements are confined to the regions away from the source where Formula 7 is applicable, the value of $\Delta$ can be found very easily. By differentiating $n$ as given by Formula 7 twice with regard to X, Y, Z, adding and dividing by $n$, it is found that $$\frac{\Delta n}{n} = \Delta = -\frac{2\pi^2}{a^2} + \frac{1}{b_{1,1}^2} \qquad (8)$$

This value of $\Delta$ applies to a structure having a square cross-section. For one having a rectangular cross-section with the sides $a_1$ and $a_2$, the formula for $\Delta$ becomes:

$$\Delta = \frac{1}{b_{1,1}^2} - \frac{\pi^2}{a_1^2} - \frac{\pi^2}{a_2^2} \qquad (9)$$

To find a numerical value for $\Delta$, it is necessary to substitute the value for $a$, the length of the side of the structure, and the value of $b_{1,1}$, which is given by the decrease of the neutron density along the central axis of the structure. For $X=0$, $Y=0$ Formula 7 gives $$n = C_{1,1} \cdot e^{-\frac{Z}{b_{1,1}}} \qquad (10)$$

From two observed values of $n$ ($n_1$ and $n_2$) in adjacent horizontal planes $Z_1$ and $Z_2$ of the structure, we have $$\log_e \frac{n_1}{n_2} = \frac{Z_2 - Z_1}{b_{1,1}} \qquad (11)$$

The value of $b_{1,1}$ can thus be obtained. With the value of $b_{1,1}$ found, the value of $\Delta$ can be found from Formula 8 for a structure with a square cross-section or from Formula 9 for a structure with a rectangular cross-section.

It is to be noted that $b_{1,1}$ is the coefficient of only the first term of the series in Formula 6. If the planes at which measurements are made are sufficiently far from the source, it has been found that the value of $b_{1,1}$ does not need correction for the small second and third terms, which are only large near the source. The effect of the higher harmonic terms can be checked by measuring the neutron density across a Z plane to see if the measurements indicate the presence of the higher harmonics. If the measurements show a significant departure from a cosine curve, then coefficients of the higher harmonic terms can be found to suit the measurements made. Since $b_{1,1}$ is to be found, the values of the higher harmonic terms in (6), if found to be significant, can be computed from (6$a$) with the value of $b_{1,1}$ as found by Formula 11, as a correction to the observed values of $n$, in a formula where $$n - (\text{higher harmonic terms}) = \text{first term} \qquad (7)$$

a well-known mathematical expedient in dealing with an infinite series.

Slots 4EE, 4E and 4W, 4WW in the structure described are used to determine whether harmonic corrections are required. This is done by measuring the neutron distribution across the pile by using indium foils as above described to see whether this distribution fits Formula 7 using the values of $b_{1,1}$ as obtained by Formula 11. If not, harmonic corrections are applied to the observed values $n$ which then agree with Formula 7. The corrections can then be computed for lower planes if measurements in these planes are to be utilized for $\Delta$ determinations.

However, as such harmonic corrections 3 feet or more away from the source approach the experimental error in measuring the neutron density, good values of $\Delta$ can be obtained by disregarding measurements made in planes near the source, and by computing the $\Delta$ value found for a higher plane, when the density readings on these planes are corrected for the side and end effects. These latter corrections are: a correction required because the effective side of the structure is larger than the actual side and a correction required by the fact that the height of the column is finite. These boundary corrections are needed because the neutron density is not zero either at the sides or top of the structure due to neutron leakage out of the structure, whereas Formula 6 assumes the neutron density to be zero at these boundaries. These corrections will be discussed in turn.

The neutron density according to Formula 6 should reach zero at $X = a/2$ and $Y = a/2$ for a structure having a square cross-section. It is found that the observed neutron densities are not zero at the surface but do agree with Formula 6 where $a$ is larger than the geometrical side $a_0$ by a few centimeters. The proper value of $a$ to use in (6) may be found by two observations of the neutron density $n_0$ at the center and $n(a_0)$ at the surface of the pile between the levels of the Z planes measured, then $$n(a_0) = n_0 \cos\left(\frac{a_0}{a} \cdot \frac{\pi}{2}\right) \qquad (12)$$

the value $a$, rather than $a_0$, should be used in computing $\Delta$ from Formula 8.

The second correction is due to the finite height of the column, known as the end or top correction. Close to the end, or top, the neutron leakage is increased, and to obtain corrected neutron densities in planes, $Z_0$, Z, near the top, the values given by Formula 10 must be multiplied by $$1 - e^{-\frac{2}{b_{1,1}}(Z_0 - Z)} \qquad (13)$$

to give the observed neutron densities where $Z_0$ is the actual value for Z for the top. If conversely, we take the observed neutron densities which have been reduced by nearness to the top and divide them by (13), we obtain increased values which we may call corrected neutron density values which will then agree with Formula 10 and which may be used to compute $b_{1,1}$ from Formula 11 from measurements made in planes near the top.

In case a spherical structure is desired in place of the parallelopiped just described, it is also possible to find a mathematical expression for the decay of neutron density along a radius of the sphere when the source is at the center. The differential Equation 5 in polar coordinates is $$\frac{d^2(nr)}{dr^2} = -\frac{K-1}{L^2 + \frac{1}{4}r_0^2} \cdot nr \qquad (14)$$

If the source is placed at the center of the sphere and if the density at the outside is maintained at zero by surrounding the structure with a sheet of cadmium that absorbs all neutrons reaching the periphery, a solution that agrees with the observations is:

$$n = \frac{1}{r}\left(A e^{\sqrt{\Delta}r} - B e^{-\sqrt{\Delta}r}\right) \qquad (15)$$

where $$\Delta = \frac{1-K}{L^2 + \frac{1}{4}r_0^2}$$

and where A and B are two constants chosen to make the solution suit the boundary conditions. The value of $\Delta$ may then be deduced from two neutron density observations at different positions along the radius.

However, if K is greater than unity, the constants A and B will be chosen as complex numbers. In such a case an alternative equation can be given in terms of trigonometric functions:

$$n = \frac{1}{r}\left(E \cos\sqrt{-\Delta}r + F \sin\sqrt{-\Delta}r\right) \qquad (15a)$$

where E and F are real numbers.

Other solutions may also be found for cylindrical and other structural shapes, but as these are more complicated, they are not to be recommended in comparison with the two structures described above. The parallelopiped structure is preferred from a structural standpoint.

Two important deductions may be reached at once from the numerical value of $\Delta$. The first is that the value of the reproduction factor K is greater or less than unity depending on whether the value of Δ comes out negative or positive, respectively. This fact, which follows from Equation 4, does not require a knowledge of the value of the quantities in the bracket of that equation.

The second deduction that may be drawn from the magnitude of Δ is the critical size to which the system must be built to maintain a nuclear chain reaction. This size is the size where the total surface to volume ratio of the entire pile is such that the rate of neutron loss is reduced to a value less than the rate of neutron production, the latter being expressed by the numerical value of Δ. As Δ is a function of the geometrical arrangement of the materials and the impurities in the materials, the system to be self-sustaining, when Δ is found to be negative (determining K to be greater than unity), can be built to critical size in a number of shapes. In case the self-sustaining chain reacting system is to be built in the form of a large spherical structure, the critical radius $r_c$ is given by $$r_c = \frac{\pi}{\sqrt{-\Delta}} \quad (16)$$

In case the structure is to be a rectangular parallelopiped with sides $a_1$, $a_2$ and $a_3$, the critical size is given by the formula $$-\Delta = \frac{\pi^2}{a_1^2} + \frac{\pi^2}{a_2^2} + \frac{\pi^2}{a_3^2} \quad (17)$$

In case the structure is to be built up as a cylinder of height H and radius r, the critical values of these quantities may be computed from the formula $$-\Delta = \frac{\pi^2}{H^2} + \frac{(2.405)^2}{r^2} \quad (18)$$

It will thus be seen that for a given amount of material in the system the spherical overall shape is to be preferred. Any deviations from the spherical shape must be compensated for by the use of additional material. These computations do not require knowledge of the values in the bracket of Equation 4.

In the manner stated above, from a single series of measurements, the fact that K is greater or less than unity can be determined from the sign of Δ, and if K is determined to be greater than unity, the critical size required for a self-sustaining chain reaction can be calculated, using the numerical value obtained for Δ. The value of K will hold for the materials and geometries used, no matter what the overall shape of the system may be. From the value of Δ and by using the presently known values of L and $r_0$ the numerical value of K can be computed within a 1 percent error from Formula 4.

Broadly stated, therefore, as to the method of my invention, I provide a small but representative portion of a structure proposed as having a possibility of sustaining a chain reaction, and then measure the neutron distribution at least along one dimension of said structure, and from the measurements so made compute the ratio of the Laplacian of the neutron density to the neutron density found in the structure. This ratio is known as Δ and has, for chain reacting structures of the type described, the direct relationship to K, so that the value of K can also be determined, if desired, using presently known values of L and $r_0$.

As a specific example of the uses of the exponential pile, and the described method of measurement for a specific geometry and for specific materials, a pile has been built wherein the uranium bodies 17 (Fig. 3) consisted of 288 boxes in the shape of cans 8 inches on the side, made of thin tinned iron sheets each weighing about 500 grams. Each box was filled with 60 pounds of commercially obtained uranium oxide ($U_3O_8$) powder. The boxes were uniformly disposed throughout a pile of graphite blocks 4 inches x 4 inches x 8 inches, in cubical spaced relationship, with the boxes spaced 16 inches apart in alternate layers measuring from center to center, as shown in Fig. 11. The graphite was similar to that used as anodes in electrolytic smelting. The total weight of the uranium oxide was 17,280 pounds, or approximately 8⅔ tons. The graphite used had a density of 1.63 and a total weight of about 26 tons. The units were tightly packed to eliminate air spaces as far as possible, and the materials were known to be impure.

A neutron source was disposed at the bottom of the pile. For this purpose, two grams of radium mixed with beryllium were placed in a slot 36 disposed in the paraffin base 16 (Fig. 1). A graphite rod 37 (Figs. 5 and 8) may be placed in the slot 36, in which case the rod is slidable in the slot. The neutron source may then be disposed in the cylindrical slot 38 in the graphite rod 37, a suitable capsule 39 (Fig. 9) made for example, of beryllium, being adapted to contain the neutron source. Geiger-Muller counter readings of the neutron induced indium foil radioactivity were made for the seven slots shown in Fig. 1 and identified as slots 1 to 7, inclusive, at points close to the vertical axis of the column, and on top of the pile. Measurements were made both with and without the artificial source disposed in the slot 36.

The following Table I gives the values of measurements made, the values representing neutron density in terms of counts per minute obtained from the exposed indium foils:

TABLE I

[Measurements near Z axis]

| 1 | 2 | 3 | 4 | 5 | 6 |
|---|---|---|---|---|---|
| Position | Counts with source | | Cd ratio | Counts without source, No Cd | Net effect of chain reaction started by source neutrons |
| | No Cd | With Cd | | | |
| 1 | 234.8 | 44.4 | 5.29 | .252 | 234.5 |
| 2 | 69.37 | 12.00 | 5.78 | .320 | 69.05 |
| 3 | 23.64 | 4.143 | 5.71 | .365 | 23.28 |
| 4 | 8.93 | 1.610 | 5.54 | .365 | 8.57 |
| 5 | 3.594 | .638 | 5.63 | .394 | 3.200 |
| 6 | 1.572 | .286 | 5.50 | .324 | 1.248 |
| 7 | .684 | .112 | 6.11 | .235 | .449 |
| (8, top) | .070 | | | | |

The first column of Table I represents the position of the indium foil in the column, that is, for which of the seven slots the readings shown in the remaining columns were made. Columns 2 and 3 in the table give the indium foil counts recorded with the source of neutrons in place in the slot 36. Column 2 gives the readings where no cadmium surrounded the indium foil. Column 3 is a tabulation of count readings with the foil surrounded with cadmium. Column 4 gives the ratio of counts between the values in column 2 and column 3; that is, the ratio between the counts with the cadmium and without cadmium surrounding the detector. The fact that this ratio, referred to as the cadmium ratio, is substantially the same for all positions after the number 1 position is due to the fact that the neutron energy spectrum beyond the first position has reached a value which is no longer affected appreciably by the proximity of the source. Although in this particular case, the cadmium ratio is somewhat higher at position 7, the departure is not sufficient to prevent the achievement of reasonably accurate results when reading 7 is used with others, for the computation of Δ.

Beyond the second slot, identified as slot 2 in Fig. 1, the source no longer directly contributes thermal neutrons to the chain reaction. The original neutrons from the source disposed in the slot 36 are all reduced to thermal energies before distances beyond slot 2 are reached. These thermal neutrons are absorbed partly in the uranium and give rise to nuclear fissions, producing fast fission neutrons. These fast fission neutrons are in turn slowed down to thermal energies in the graphite to produce further fast fission neutrons, by entering uranium, etc. Thus, as indicated by the substantial uniformity of the cadmium ratio and as required by the analyses upon which the actual computation of $\Delta$, below is based, the chain fission reaction is responsible for the neutron density at slots 2 to 7, inclusive, this chain reaction being initiated in the uranium of the lowest uranium bearing layer of column 15 by the primary neutrons emanating from the source in the slot 36.

Column 5 in Table I gives the indium foil counts measured at the various positions in the column without the presence of the source in the slot 36 and without cadmium surrounding the indium foil. The count values set forth in Column 5 are due to neutrons from spontaneous fission of the uranium in the structure.

It is to be noted that the chain reaction is also present due to this natural fission. However, the count values are low, and a more complicated solution would be required to find $\Delta$ from the observed values representing the neutron density without the source, which is quite different from that existing when a source is utilized to start the chain reaction at one end of the structure. The use of the source provides larger density values, and an exponential density decay curve along one dimension of the structure, from which $\Delta$ can readily be computed, as pointed out above.

Column 6 of Table I gives the mathematical difference between the values in Columns 2 and 5, these values indicating the net effect of the chain reaction initiated by the source neutrons. Because the cadmium ratio is substantially constant, these values in Column 6 can be taken to represent the thermal neutron densities, as well as the total neutron densities, resulting from the reaction.

Indium foil measurements made in slots 4WW, 4W and 4E, 4EE indicated that the neutron density distribution across the pile at that level was very little affected by the source, and that good values of $\Delta$ could be obtained by using the first term (which includes $b_{1,1}$) alone in higher planes when the readings in these higher planes are corrected for top effect and the proper value for $a$ is found in each case. Consequently, readings taken in positions 1 to 4, inclusive, may be discarded.

To find the effective sides $a$ at various levels, formula $$n(a_0) = n_0 \cos\left(\frac{a_0}{a} \cdot \frac{\pi}{2}\right) \quad (12)$$

is used. Measurements were made of indium foil counts due to the neutron densities on the outer surface of the column at various heights, and are tabulated below in Table II for the top portion of the pile. The detector foil positions were between the positions of the measuring slots, on the exterior surface of the column. The axis density counts in Column 3 are extrapolated for interplane positions corresponding to the positions of the foils on the exterior surface.

TABLE II

| 1 Position | 2 Counts on Surface | 3 Counts on Axis | 4 Actual Side $a_0$, cm. | 5 Effective Side $a$, cm. |
|---|---|---|---|---|
| 5½ | .170 | 2.36 | 243.84 | 254.5 |
| 6½ | .129 | 1.03 | 243.84 | 262.5 |

The values in Table II, Column 5 can be used for the quantity $a$ in computing the value of $\Delta$.

The end or top corrections are found by the formula $$1 - e^{-\frac{2}{b_{1,1}}(Z_0 - Z)} \quad (13)$$

using the approximate values of $b_{1,1}$ obtained from the readings in Table I, Column 6 by the use of formula $$\log_e \frac{n_1}{n_2} = \frac{Z_2 - Z_1}{b_{1,1}} \quad (11)$$

where $Z_1$ and $Z_2$ are the distances from the source of the positions in which readings were taken.

The correction factors are as follows:

TABLE III

| 1 Position | 2 Correction Factor |
|---|---|
| 5 | .997 |
| 6 | .98 |
| 7 | .87 |

It is to be noted that the end correction increases as the end is approached, and is very small at position 5.

The measurements of Table I, Column 6 are now ready for correction for top effect, and for use in computation with the values found for the effective sides at various Z planes to ascertain the final and more accurate values of $b_{1,1}$, and then to find $\Delta$ at two positions in the pile where the effect of the source is minimized. The two values found for $\Delta$ are then averaged to find the average $\Delta$ for the upper portion of the pile. The results are set forth in Table IV, below.

TABLE IV

| 1 Position | 2 Net Counts | 3 With Top Correction | 4 $\frac{n_1}{n_2}$ | 5 Effective Side $a$, cm. | 6 $b_{1,1}$ | 7 $\Delta$ |
|---|---|---|---|---|---|---|
| 5 | } 3.200 | 3.209 | 2.5208 | 254.5 | 43.948 | 2.127×10⁻⁴ |
| 5½ | | | | | | |
| 6 | } 1.248 | 1.273 | 2.5108 | 262.5 | 44.63 | 2.156×10⁻⁴ |
| 6½ | | | | | | |
| 7 | .449 | .507 | | | | |
| Average | | | | | $\Delta = 2.141 \times 10^{-4}$ | |

In the above table, Column 2 gives the observed counts due to the chain reaction taken from Column 6, Table I. In Column 3 the count readings have been multiplied by the end correction factors given in Table III. Column 4 gives the count ratios $$\frac{n_1}{n_2}$$

of readings in adjacent planes. In Column 5 are set forth the effective sides $a$ as given by Table II. In Column 6 are given the values of $b_{1,1}$ as computed from the formula $$\log_e \frac{n_1}{n_2} = \frac{Z_2 - Z_1}{b_{1,1}} \quad (11)$$

In the case of the structure measured $Z_1 - Z_2$ 16 inches = 40.64 cms. between all positions. In Column 7 the values of $\Delta$ are given as found from the use of the computed values of $b_{1,1}$ and the effective side $a$ by use of the formula $$\Delta = \frac{-2\pi^2}{a^2} + \frac{1}{b_{1,1}^2} \quad (8)$$

The mean value of $\Delta$ computed from readings in positions 5, 6 and 7, is $2.141 \times 10^{-4}$ and is positive in sign. It follows that the value of the reproduction factor K of the structure measured was less than unity. Consequently, this particular geometry and materials would never provide a self-maintaining chain reaction no matter how large a structure was used.

For some purposes, particularly to study variations in the reproduction factor K as brought about by changes in the geometry of the uranium bodies and the purity of the uranium and the slowing medium in the system, it is desired to find the numerical value of the reproduction factor K. For this purpose, Formula 4 is useful by including the best presently known values of L and $r_0$ and using the value of $\Delta$ as computed, as follows:

$$K-1=-\Delta(L^2+\tfrac{1}{4}r_0^2) \qquad (4)$$

substituting the value of $\Delta$ $2.141\times10^{-4}$ in the structure measured and using the values of $L=18.5$ cm. and $r_0=35.5$ cm. as previously given for a structure of uranium and graphite, K is found as follows: substituting in (4) $K-1=2.141\times10^{-4}(18.5^2+\tfrac{1}{4}\times35.5^2)$ solving: $K=.86$ The value of the reproduction factor K is thus found to be 0.86.

While the calculated values of $L=18.5$ cm. and $r_0=35.5$ cm. are probably not accurate within a 5 percent to 10 percent error when combined, it will be noted that these values only enter into the departure of K from unity. As the departure of K from unity for structures such as described is only on the order of 10 percent, the use of these L and $r_0$ values introduces an error of 1 percent or less in the final value of K.

As stated above, the best previously known figures for the K factor of a mixture of theoretically pure uranium powder and water is $K=.79$. Similarly the best K factor for a mixture of theoretically pure uranium powder and graphite has been computed to be $K=.785$. The value of $K=.86$ obtained as above set forth for uranium oxide bodies of substantial size spaced in graphite, both known to have impurities therein, indicated that a saving in resonance absorption losses must have been made by aggregating the uranium into substantial masses, but that other losses were too large to provide chain reaction capable of being maintained in a system of finite size.

Auxiliary measurements were made, and it was found that part of the loss in the K factor was due to neutron absorption in the tined iron cans holding the uranium oxide. It was further found that the purity of the oxide could be improved, and that the effect of the uranium could be still further improved by compression of the oxide or use of the uranium in the form of metal.

A number of intermediate piles were then built and measured by the method set forth herein, using compressed uranium oxide and graphite and uranium of improved purity, in structures having improved geometries of the uranium bodies in the graphite. The first design found to give a K factor greater than unity, when measured by the means and method described herein, attained a $\Delta$ of $-1.06\times10^{-5}$ indicating a K factor of 1.007. As the critical size required for this particular type of structure to become self-sustaining, was found to require approximately 10,000 tons of graphite and 3,000 tons of uranium oxide in accordance with Formula 16, further experiments were made to increase the K factor by including uranium metal in the structure and also by utilizing $UO_2$ in place of $U_3O_8$ together with graphite of still better purity, the uranium bodies being again rearranged to a more favorable geometry. A structure was built and measured that indicated that a chain fission reaction could be produced and sustained in a system of practical size.

As an example of the accuracy of the measurements that can be obtained by utilizing the means and method described herein, a self-sustaining chain reacting structure was proposed, utilizing both uranium metal bodies and compressed $UO_2$ bodies spaced in graphite of several different purities. The K factor for each of the combinations of uranium and carbon proposed was measured by means of the intermediate pile and method as described herein. K factors were found which indicated that a self-sustaining chain reacting structure could be built having an average K factor of 1.050 utilizing about 480 tons of graphite and 50 tons of uranium. The proposed structure was built and was found to be capable of sustaining a chain reaction by virtue of nuclear fission at a very slightly smaller size than originally computed, with an actual K factor of 1.054. This self-sustaining chain reacting system has been operated at various rates of power production in the form of heat.

Dissipation of large amounts of power in a self-sustaining chain reacting system such as described immediately above, requires the insertion within the structure of a coolant, tubes and passageways for the coolant, and, in many cases requires modification of the shape of the uranium bodies to provide for efficient cooling thereof. The procedure as outlined herein is ideally suited to determine effect of these foreign bodies in the structure, as it is impossible to find the K factor by reliance on theory alone. By the use of the intermediate pile, any proposed cooling system can be incorporated therein, the $\Delta$ measured and the K determined.

It should be pointed out here, with respect to the successful attainment of a self-sustaining chain reacting system, that the number of neutrons made directly available to the chain reaction by aggregating the uranium into separate bodies spaced through the slowing medium was found to be a critical factor in obtaining a self-sustaining chain reaction when utilizing natural uranium and graphite. Utilizing theoretically pure carbon and theoretically pure uranium, it has been computed that the highest K obtainable is about 1.1 whereas the same volume ratio of uranium powder and graphite, with the powder distributed uniformly throughout the graphite, gives a K less than unity. Actual K factors as high as 1.08 have been obtained using aggregation and as pure materials as is presently possible to obtain, combined in the best known geometry. It is thus clearly apparent that the aggregation of the uranium into masses separated in the slowing material is one of the most important, if not the most important factor entering into the successful construction of a self-sustaining chain reacting system utilizing relatively pure materials in the best geometry at present known. The presently described structure and its method of measurement determined what the effect of such aggregation would be on the reproduction factor K of the system and thereby proved that my invention incorporating aggregation of the uranium into masses of substantial size was the principal factor in the successful construction of a self-sustaining chain reacting system utilizing natural uranium.

It will be understood that unless otherwise specified, references in the claims to measurement of neutron density or gradient or of neutron density distribution are intended generically to include measurements which may actually be no more than measurements of relative neutron densities, since an important advantage of the invention, when practiced in the presently preferred manner, is that actual neutron densities need not be determined, i. e., the readings need only be relative, as by noting the counts per minute obtained from irradiated foils.

It is also to be noted that while my invention has been described herein as applied to and utilizing a structure having a solid slowing agent such as graphite incorporating uranium aggregated into separate masses, the invention can equally well be used in conjunction with intermediate structures having liquid slowing agents, such as heavy water, with the uranium in the form of separate large masses therein; or in the form of fine particles mixed with the liquid in a form commonly called a slurry. In such cases neutron density measurements are made in the liquid contained in a tank of the desired size and shape in the same manner as described herein.

While the theory of the nuclear chain fission mechanism in uranium set forth herein is based on the best presently known experimental evidence, I do not wish to be bound thereby, as additional experimental data later discovered may modify the theory disclosed. Any such modification of theory, however, will in no way affect the results to be obtained in the practice of the invention herein described and claimed.

I claim:

A test exponential pile comprising a column of graphite of rectangular parallelopiped shape, a plurality of bodies containing natural uranium disposed therein in a geometrical pattern of cell units, each cell unit being composed of uranium embedded in graphite, said pile being of sub-critical mass, a neutron source located adjacent the bottom face of said column of graphite at the center thereof, there being a plurality of spaced vertically aligned measuring slots extending into the column to points near the vertical axis of the column and a plurality of spaced horizontally aligned measuring slots located approximately at the vertical midplane of the column, and an indium foil within at least one of the slots for use in determining the neutron densities within the aforesaid slots.

References Cited in the file of this patent

UNITED STATES PATENTS

| | | |
|---|---|---|
| 2,127,193 | Toulmin | Aug. 16, 1938 |
| 2,206,634 | Fermi et al. | July 2, 1940 |

FOREIGN PATENTS

| | | |
|---|---|---|
| 114,150 | Australia | May 2, 1940 |
| 114,151 | Australia | May 3, 1940 |

OTHER REFERENCES

Anderson et al.: Phy. Rev. 56, 284–6 (1939).

Naturwissenschaften, vol. 27 (1939), pages 402, 403, 406–410.

Rev. Physical Chem. (Japan), vol. 13 (1939), pp. 145–150.

Naturwissenschaften, vol. 27 (1939), pp. 404, 405.

Power, July 1940, page 58.

Smyth Report, "Atomic Energy for Military Purposes," August 1945.

Anderson et al.: MDDC–880, U. S. A. E. C., date of manuscript Mar. 21, 1942, date declassified, January 28, 1947, 5 pages.

Kelly et al.: Phy. Rev. 73, 1135–9 (1948).